(12) United States Patent
Holzhauer et al.

(10) Patent No.: US 11,504,755 B2
(45) Date of Patent: Nov. 22, 2022

(54) DEVICE AND METHOD FOR TRANSPORTING STRIP MATERIAL, IN PARTICULAR A HOT STRIP

(71) Applicant: SMS GROUP GMBH, Duesseldorf (DE)

(72) Inventors: Thomas Holzhauer, Kirchhundem (DE); Ulrich Cramer, Attendorn (DE); Andreas Kastner, Kirchhundem (DE); Magnus Treude, Bad Berleburg (DE)

(73) Assignee: SMS GROUP GMBH, Duesseldorf (DE)

( * ) Notice: Subject to any disclaimer, the term of this patent is extended or adjusted under 35 U.S.C. 154(b) by 0 days.

(21) Appl. No.: 17/262,115

(22) PCT Filed: Jan. 16, 2020

(86) PCT No.: PCT/EP2020/050970
§ 371 (c)(1),
(2) Date: Jan. 21, 2021

(87) PCT Pub. No.: WO2020/169278
PCT Pub. Date: Aug. 27, 2020

(65) Prior Publication Data
US 2021/0291245 A1 Sep. 23, 2021

(30) Foreign Application Priority Data

Feb. 21, 2019 (DE) .......................... 102019202395.9
Nov. 18, 2019 (DE) .......................... 102019217682.8

(51) Int. Cl.
*B65G 43/10* (2006.01)
*B65G 13/06* (2006.01)
(Continued)

(52) U.S. Cl.
CPC ............. *B21B 39/165* (2013.01); *B65G 13/11* (2013.01); *B65G 2203/0291* (2013.01); *B65G 2207/48* (2013.01)

(58) Field of Classification Search
CPC ......... B21B 39/16; B65G 13/06; B65G 13/11; B65G 43/10
(Continued)

(56) References Cited

U.S. PATENT DOCUMENTS 7,542,823 B2 * 6/2009 Nagai .................. B65G 47/261
198/781.05
8,028,817 B2 * 10/2011 Itoh ........................ B65G 47/31
198/460.1
(Continued)

FOREIGN PATENT DOCUMENTS

DE 202014011026 U1 7/2017
EP 3049198 B1 6/2017
(Continued)

OTHER PUBLICATIONS

Anonymous:Eco Slide Disc Operation time extended by a factor of ten Siemens Vai, Mar. 1, 2014 (Mar. 1, 2014), XP055478703.
(Continued)

*Primary Examiner* — Douglas A Hess
(74) *Attorney, Agent, or Firm* — Amster, Rothstein & Ebenstein; Steven Hertzberg

(57) ABSTRACT

A device for producing strip material, such as a hot strip. The device includes lateral guide elements which are arranged on both sides of the strip material and, in particular, along a roller table having several rollers, and at least one rotating wear body on each side guide element. In order to minimize the wear of guide elements when transporting the strip material over a roller conveyor, a speed control device regulates a rate of speed of the at least one wear element.

(Continued)

Further, a position control device is provided for setting an extended position of the at least one wear element. The position control device sends control signals to a positioning drive for extending the at least one wear body to an extended position.

21 Claims, 2 Drawing Sheets

(51) Int. Cl.
  *B21B 39/16* (2006.01)
  *B65G 13/11* (2006.01)
(58) Field of Classification Search
  USPC .................................. 198/341.09, 577, 620
  See application file for complete search history.

(56) References Cited

U.S. PATENT DOCUMENTS

| | | | | |
|---|---|---|---|---|
| 9,446,908 | B2* | 9/2016 | Danelski | B65G 43/08 |
| 9,469,479 | B2* | 10/2016 | Matsumoto | B65G 37/00 |
| 10,280,009 | B2* | 5/2019 | Taylor | B65G 43/08 |
| 10,322,883 | B2* | 6/2019 | Itoh | B65G 43/10 |
| 10,654,659 | B2* | 5/2020 | Combs | G05B 19/4189 |

FOREIGN PATENT DOCUMENTS

| | | |
|---|---|---|
| JP | S5350039 A | 5/1978 |
| JP | S54082032 U | 6/1979 |
| JP | S60195106 U | 12/1985 |
| JP | H05161917 A | 6/1993 |
| WO | 2015043926 A1 | 4/2015 |

OTHER PUBLICATIONS

International Search Report, dated Apr. 6, 20120 in corresponding International Application No. PCT/EP2020/050970.

Written Opinion of the International Search Authority dated Apr. 6, 20120 in corresponding International Application No. PCT/EP2020/050970.

* cited by examiner

DEVICE AND METHOD FOR TRANSPORTING STRIP MATERIAL, IN PARTICULAR A HOT STRIP

CROSS REFERENCE TO RELATED APPLICATIONS

This application is a national phase of PCT application No. PCT/EP2020/050970, filed Jan. 16, 2020, which claims priority to DE patent application No. 102019202395.9, filed Feb. 21, 2019, and DE patent application No. 102019217682.8, filed Nov. 18, 2019, all of which are incorporated herein by reference thereto.

BACKGROUND OF THE INVENTION

The invention relates to a device and a method for transporting strip material, in particular hot strip, according to the preamble of claim 1.

The production of metal strips and their transport by transport devices in a predetermined transport direction over a predetermined route are known. The roller tables convey the metal strips to processing machines for post-processing or to reel devices for temporary storage. For preventing the strips from slipping sideways from the roller tables, lateral guides are provided on the roller tables, which hold the metal strips on the roller tables. Particularly during winding, it is necessary to align the metal strips precisely, also laterally, to minimize the offset of the individual turns of the metal strip on the reel and to achieve a uniform side surface. This means that the lateral guides must guide the metal strips relatively closely.

Devices for the lateral guidance of metal strips on roller tables are usually half-height side walls, which are also referred to as lateral guide rulers. These lateral guide rulers are provided with fixed wear plates. The wear plates are exposed to high levels of wear, as the edges of the running metal strips on the roller tables carve more or less deep grooves into the wear plates. The wear on the stationary wear plates essentially always occurs at the same point, and therefore the wear plates must be renewed repeatedly depending on the degree of use. However, the guides can only be exchanged when the system is shut down, resulting in a correspondingly high maintenance effort.

As a further development, it was therefore proposed in DE 20 2014 011 026 U1 to provide a device for the lateral guidance of a metal strip running over a metal strip conveyor with at least one wear body with a wear surface that can be rotated in a controlled manner into several defined rotational positions, the wear surface being essentially flat and in all defined rotary positions parallel to a guide plane.

However, regardless of when the wear part is rotated, the wear on the components is not completely eliminated even by rotating the wear parts; ultimately the wear parts are unevenly loaded. In addition, this device has the disadvantage that a rotation of the wear parts is only possible when no strip is pressing against the wear part: the rotation can therefore either only take place between two consecutive strips or when the system is at a standstill.

WO 2015/043 926 A1 discloses a disc side guide in which wear discs are also rotated stepwise. The wear disks are only rotated during the rolling breaks.

JPH05161917 suggests using umbrella-shaped rollers for guidance on a side ruler, which are kept in a constant rotating movement by a flow of liquid, in order to avoid damage to the metal strip. On contact with the rolling stock, these guides will immediately assume the rolling stock speed due to the frictional force.

JPS60195106 discloses continuously rotating discs which are driven at the speed of the rolling stock, the peripheral speed at the contact surface being equal to the transport speed of the rolling stock.

In all of these known prior art solutions, the fixed, adjustable wear bodies only wear in the limited contact area between the rolling stock and the guide. This uneven wear of the guide surface leads to functional impairment. The wear bodies must be replaced at short intervals. The system availability decreases due to the changeover times. Disc side guides, which are adjusted mechanically or with a stepper motor during the production break, wear out selectively in the same area until the next adjustment. In the known solutions with continuously rotating discs, the discs assume the transport speed of the rolling stock by friction at the latest upon contact with the rolling stock. Although this reduces wear, it negatively affects the quality of the guidance of the strip due to the absence of the frictional force between the rolling stock and the tension-building machine, namely the driver or the reel. This condition always occurs in hot rolling mills when the end of the strip leaves the last finishing stand. This has a negative impact on the winding quality of the strip due to increased telescopic nature and deviating windings.

Based on the mentioned prior art, the object of the invention is to further minimize the wear of guide elements during the transport of hot strip and to thereby increase maintenance intervals.

SUMMARY OF THE INVENTION

This object is achieved by a device for transporting strip material according to the independent device claim and a method for transporting strip material according to the independent method claim. Preferred embodiments are the subject of the respective dependent claims.

Transport devices include, for example, transfer plates or roller tables, for transporting the metal strips over a certain distance. Metal sheets are transported in a similar manner over a certain distance. The invention also relates to the transport of metal sheets, wherein in the following the term strip material is used exclusively for reasons of simplicity, without having a restrictive effect.

According to the invention, the lateral guide elements are provided with rotating wear bodies. The wear bodies are rotated continuously while the strips are fed to the reel. This results in less and more even wear on the contact surfaces. At the same time, the usable wear surface at the contact points between the rolling stock and the guide is increased compared to nonadjustable or non-rotatable wear bodies. The rotation of the wear bodies creates a frictional force on the contact surface in opposition to the direction of transport of the strip. The speed of rotation of the wear bodies can be regulated. In particular, the speed of rotation of the rotating wear bodies is regulated as a function of the rolling speed, but always in such a way that the peripheral speed of the wear bodies is lower than the transport speed of the rolling stock. In particular, the angular velocity of the wear body disks is in the order of magnitude of 0.5 to 10 revolutions per minute, preferably 0.5 to 5 revolutions per minute.

In a further embodiment of the invention, the angular speed of the wear bodies is regulated according to the strip tension. In particular, when the strip tension falls below a threshold value, for example after the strip leaves the roll gap, the angular speed can be adjusted in a special manner, so that the friction results in improved guidance and a lower straightness deviation of the strip. The peripheral speed is then at a lower value than in normal operation.

The contact time per surface can be influenced by the adjustable rotation speed in dependence on the rolling stock speed. With the rotation of the wear bodies, the contact surface, and thus also the wear area, changes continuously, resulting in a more efficient use of wear bodies over the guide time.

The wear bodies can be extended laterally, i.e., in and opposite to the direction of their axis of rotation, so as to enable influencing guidance of the rolling stock by regulating the position and force of the extension device.

The term "extendable" means the overall lateral positioning. This includes the individual positioning of at least one wear body as well as the positioning of at least one wear body in operative connection together with the lateral guide element.

Compared to the prior art, continuous and lower wear can be expected with the solution according to the invention without the disadvantageous guiding properties resulting from the lack of retraction force, as is the case with the known prior art devices rotating continuously at rolling stock speed.

The size of the wear bodies depends in particular on the space available between the transport device, in particular the roller table, and the lateral guide elements.

Further developments of the invention include, among other things, cooling the rulers by means of a ruler cooling, wetting the rotating wear body disks with emulsion, additional force measurement directly on the ruler and intelligent software for predicting the next change of wear body disks by analyzing the previous course of the current rolling program.

The invention has the advantage, among other things, that the contact time between the wear body disk and the strip can be set to a desired value through the choice of the angular speed of the wear body disks. In addition, the relative speed between the wear body and the rolling stock is lower in the proposed solution than in the prior art, which has a positive effect on wear.

Further advantages of the invention are an increased operating time of the guides and thus increased availability of the system, also because less repair work is required for the installation of replacement parts due to the more uniform wear of the wear bodies. Furthermore, the winding quality is improved by the retraction force, especially at the end of the strip. This is also related to the reduction of strip edge damage.

BRIEF DESCRIPTION OF THE DRAWING

Further features and advantages of the invention will become apparent from the following description of preferred embodiments, in which reference is made to the accompanying drawings.

DETAILED DESCRIPTION OF PREFERRED EMBODIMENTS

Figure 1:
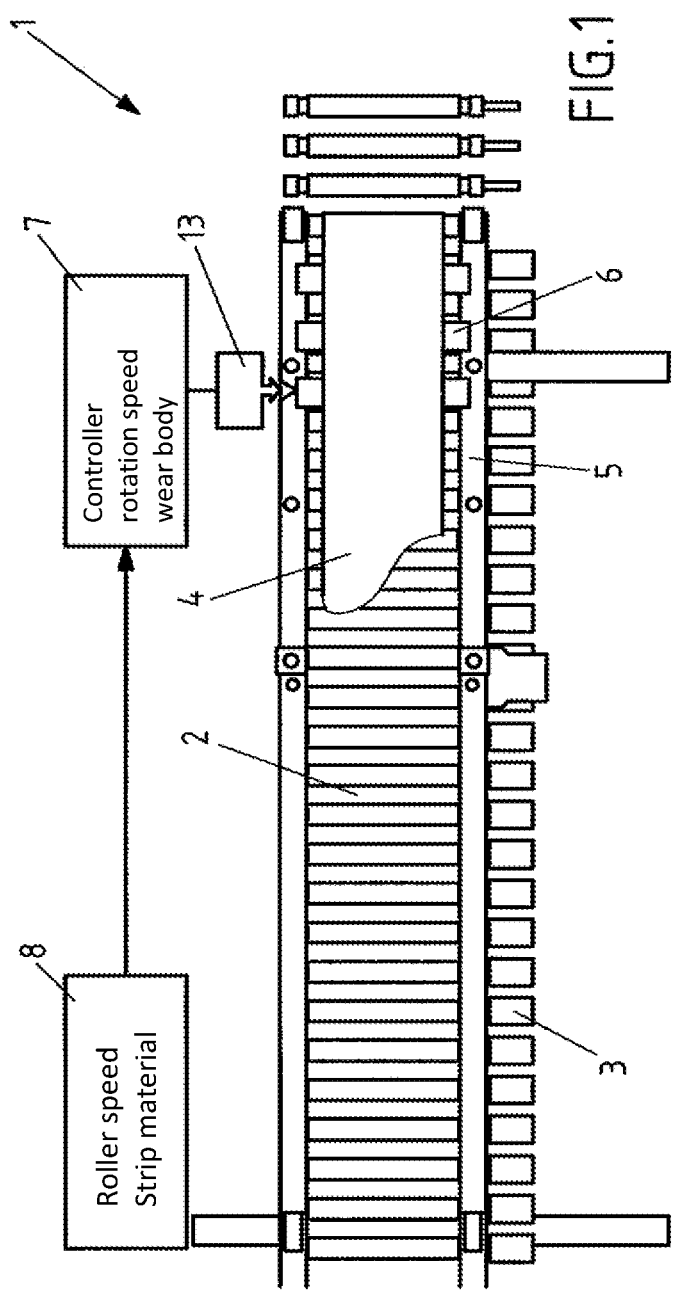
FIG. 1 shows a plan view of a device for producing and in particular transporting strip material according to an embodiment of the invention.

The drawing is not to scale and in some areas elements are highlighted to emphasize functionality. The same reference symbols are used for identical or identically acting elements, unless stated otherwise.

FIG. 1 shows a roller table 1 with rollers 2, over which a strip material 4 is transported. The rollers 2 are driven by motors 3, with the strip material being conveyed from left to right in the illustration. It is clear to the skilled person that the invention is not limited to a roller table as a transport device, rather, instead of a roller table for example transfer plates can also be used as a transport device. In the following, however, reference is predominantly made to a roller table without limiting generality.

In order to prevent the strip material 4 from falling sideways from the roller table 1, the roller table is provided with lateral guide elements 5, which are preferably arranged on both sides of the strip material 4, in particular at the level of the roller table 1 with its multiple rollers 2. As described in the introduction, these lateral guide elements 5 are, however, subject to increased wear. In order to distribute the wear caused by the strip material 4 over a larger area, a plurality of rotating wear bodies 6 is arranged on the lateral guide elements 5 on both sides of the roller table 1. Each of the wear bodies 6 is mounted for rotation about its axis of symmetry extending parallel to the rollers of the roller table and is caused by a rotary drive 13 to undergo rotary movement about its axis of symmetry. Each wear body can have its own rotary drive, or one rotary drive drives several or all of the wear bodies.

According to the invention, the speed of rotation of the wear body 6 is regulated to a predetermined target speed as a function of the advance speed of the strip material 4 on the roller table 1. For this purpose, the device includes a sensor 8 for sensing the rotational speed of the roller. The output signal of the sensor, which represents the roller speed, serves as a reference variable of a rotation speed control device 7 for the wear body.

Alternatively, the rotation speed of the wear body 6 is regulated to a predetermined target speed as a function of a contact time per surface with the strip material. In this case, the device includes a sensor, not shown, for sensing the contact time between the wear body and the strip material. The speed of the wear body is selected as a function of this contact time, i.e., the contact time is used as a reference variable for the rotation speed control device.

In both cases, however, the rotation speed of the wear body is regulated such that the peripheral speed of the wear body is less than or equal to the advance speed of the strip material on the roller table. In particular, an angular speed of the wear bodies in the order of magnitude of 0.5 to 10 revolutions per minute, preferably 0.5 to 5 revolutions per minute, has proven to be optimal.

Figure 2:
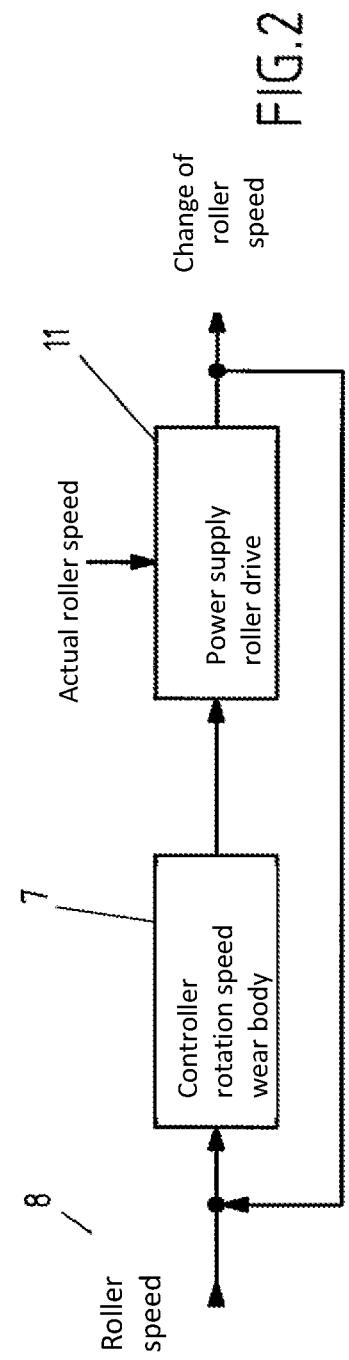
FIG. 2 shows the block diagram of a regulation of the rotational speed of the wear bodies according to an embodiment of the invention.

The regulation of the rotation speed of the wear bodies is summarized in FIG. 2. The controller 7 reads the output signal of a sensor 8 for the roller speed of the roller table 1 as a reference variable. Depending on the roller speed, the controller 7 sends a manipulated variable signal to a power supply 11 for the rotary drive of the wear body. Depending on the disturbance variable or the actual roller speed of the roller table 1, a change in rotation speed results for the drive of the wear bodies, so that the speed of the wear body is always adapted to the roller speed of the roller table. The rotary drive for the at least one wear body is preferably an electric motor.

In a further embodiment, the rotation speed of the wear bodies 6 is regulated to a predetermined, preferably reduced target speed as a function of a measured strip tension. When the strip tension falls below a defined threshold value, for example when the strip leaves the last roll stand, the target speed is reduced so that the friction increases the strip tension.

This regulation can be linked or overlaid with one or both of the aforementioned regulations.

Figure 3:
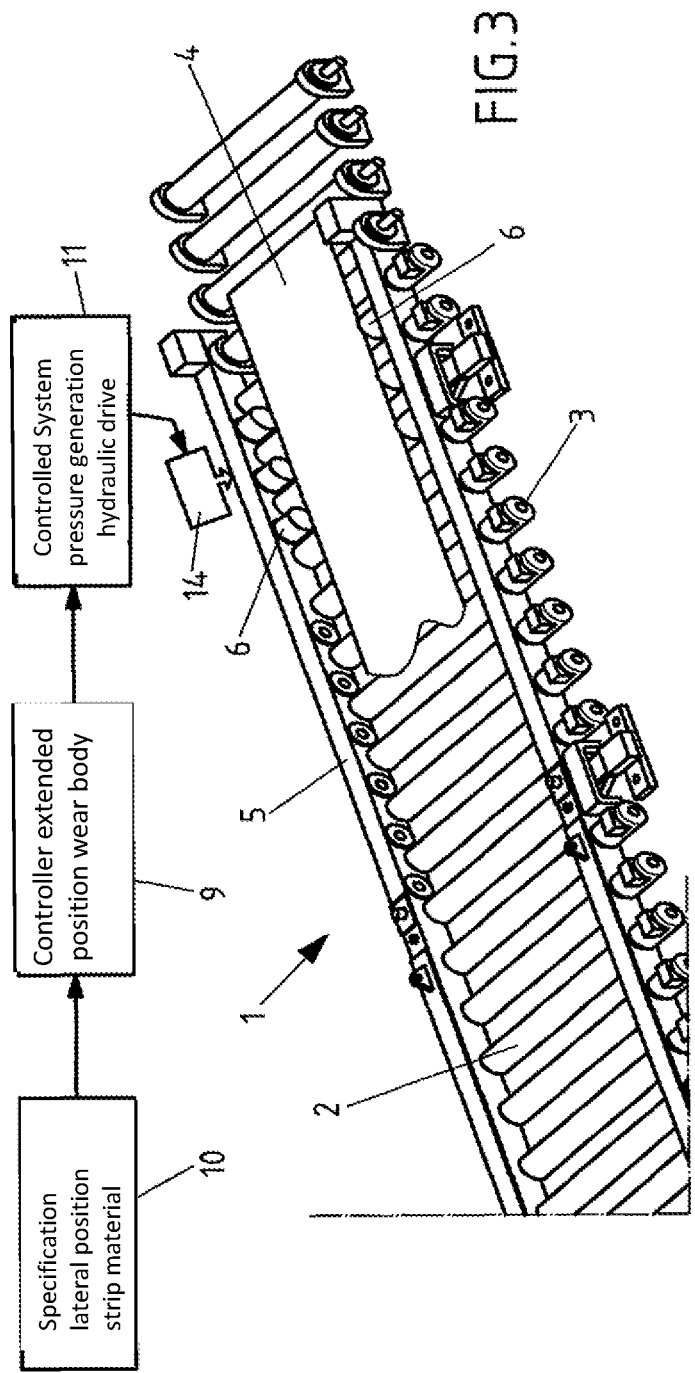
FIG. 3 shows the embodiment according to FIG. 1 in a perspective view.

In addition to the controllable setting of the rotation speed of the wear bodies 4, the lateral position of the strip material 4 on the roller table 1 is also regulated to a predetermined target position. For this purpose, the device includes a position controller 9 for regulating an extended position of the at least one wear body. FIG. 3 shows an embodiment of a roller table 1 with a regulation for the centering of the strip material 4 on the roller table 1. The strip material 4 is centered by the wear bodies 6, which can be extended laterally, i.e., transversely with respect to the transport direction of the strip material 4. Since the strip material 4 rests loosely on the rollers 2, the strip material can easily be moved laterally by extending the wear bodies and, in particular, be centered on the roller table 1. For this purpose, the device has a positioning drive 14 for extending the at least one wear body to an extended position. In one embodiment of the device according to the invention, the reference variable is a force with which the wear body 6 is pressed against the strip material 4 on the roller table 1. By detecting the force, the strip material 4 can be held in a predetermined position on the roller table 1.

In a preferred, particularly practical embodiment, the at least one wear body is moved into the extended position in operative connection together with the lateral guide elements.

Alternatively, the positioning controller 9 can read the specification of a lateral position as a reference variable. For this purpose, the device comprises a sensor 10 for sensing a lateral position of the strip material on the roller table.

Preferably, a hydraulic drive is used as the positioning drive.

Figure 4:
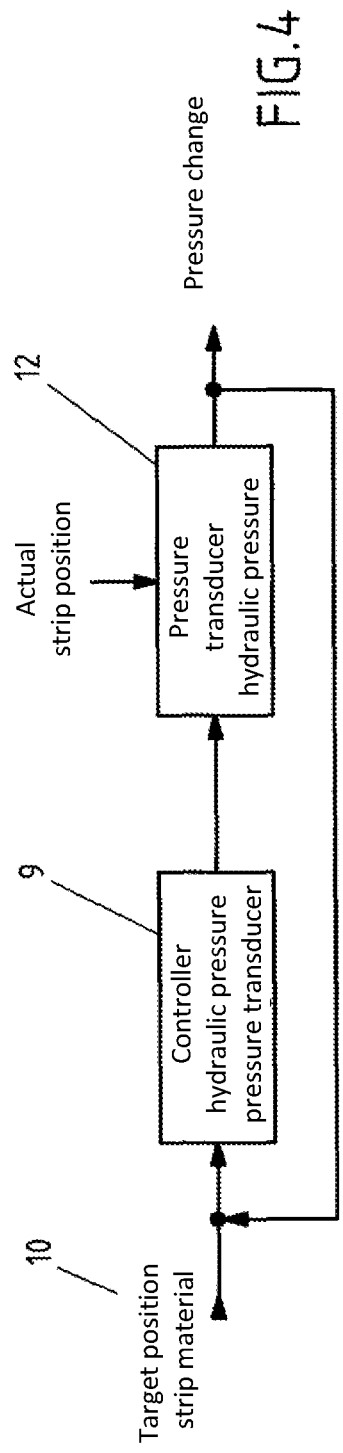
FIG. 4 shows the block diagram of a regulation of the pressure generation for extending the wear bodies according to an embodiment of the invention.

The regulation of the lateral position of the strip material 4 on the roller table 1 is summarized in FIG. 4. The controller 9 determines the hydraulic pressure of a pressure transducer 12 for the hydraulic drive. The pressure transducer 12 thus represents the actuator or the controlled system of the control loop for controlling the position of the rotating wear body 6 transversely with respect to the transport direction of the strip material on the transport device. The pressure transducer 12 takes into account the actual lateral position of the strip on the roller table. Depending on this strip position, the pressure transmitter 12 outputs a correction signal for changing the pressure.

The controls of the device preferably further include a maintenance prognosis device, not shown, which indicates a probable next maintenance date as a function of a previous maintenance date and events since the previous maintenance date.

The method according to the invention for transporting strip material is described in more detail below with reference to the figures:

The method initially provides for the transport of the strip material via the transport device 1 with lateral guide elements 5 on the sides of the transport device. The lateral guide elements are preferably arranged on both sides of the transport device, but at least on one side of the transport device. The strip material is transported on the transport device over a predetermined distance, for example to the reel.

In order to reduce the wear on the lateral guide elements due to the friction of the strip material, wear bodies 6 are provided on each lateral guide element 5, which wear bodies are rotated about an axis transverse to the transport direction. For this purpose, the wear bodies on the lateral guide element are each provided with a rotary drive 13. The target speed of the rotary drive 13 can be regulated and is specified by the speed control device 7. Instead of specifying the target speed directly, the speed control device 7 can also determine the change in speed that is required to arrive at the setpoint speed. The calculated target speed or the change in the current speed is set at the rotary drive 13.

The target speed of the wear bodies depends on the advance speed of the strip material on the transport device. When the target speed of the rotary drive 13 is set by the speed control device 7, the advance speed of the strip material or the rotation speed of the roller of the roller table can serve as the reference variable of the speed control device. Alternatively, the contact time per area with the strip material can serve as the reference variable of the speed control device 7. This prevents excessive heating of the wear bodies 6 by the strip material. As a further alternative, the retraction in the strip material can also serve as the reference variable of the speed control device 7. This enables in particular monitoring of the winding quality at the end of the strip on the reel.

By regulating the target speed of the wear bodies, damage to the strip edge during transport of the strip material can also be minimized. For this purpose, the peripheral speed of the wear body or wear bodies 6 is regulated as a function of the advance speed of the strip material on the transport device 1 in such a manner that the peripheral speed is less than or equal to the advance speed of the strip material on the transport device 1. With the peripheral speed of the wear bodies, which is dependent on the advance speed of the strip material, an angular speed of the wear bodies corresponds to a speed of the order of magnitude of 0.5 to 10 revolutions per minute. The speed is preferably regulated to 0.5 to 5 revolutions per minute.

Since, according to the invention, the wear bodies 6 can be extended in and opposite to the direction of their axis of rotation, their extended position can be adjusted to a predetermined target position by a position control device 9. The wear body is extended transversely to the transport direction into the target position by the positioning drive 14 of the wear body 6. When regulating the target position of the wear body, the force with which the at least one wear body 6 is pressed against the strip material on the transport device 1 is recorded as the reference variable of the position control device. Alternatively, the lateral position of the strip material 10 can be detected by a sensor, so that a target position for the strip material on the transport device serves as the reference variable for the position control device.

REFERENCE NUMBERS

1 Roller table
2 Roll
3 Roller drive
4 Strip material
5 Lateral guide element
6 Rotating wear body 7 Speed controller wear body
8 Roller speed sensor
9 Position controller wear body
10 Sensor target position of strip material
11 Power supply roller drive
12 Pressure transducer hydraulic drive
13 Rotary drive
14 Positioning drive

The invention claimed is:

1. A device for transporting strip material, comprising:
a transport device for transporting the strip material in a predetermined transport direction over a predetermined distance,
lateral guide elements which are arranged on at least one side of the transport device;
at least one rotating wear body on each lateral guide element, the wear body being mounted for rotation about an axis transverse to the transport direction;
a rotary drive for rotating the at least one wear body about the axis; and
a speed control device for regulating a speed of the at least one wear body to a predetermined target speed, said speed control device configured such that a peripheral speed of the at least one wear body is lower than an advance speed of the strip material on the transport device.

2. The device according to claim 1, wherein the transport device is a roller table, the device further comprising a sensor for sensing an advance speed of the strip material on the roller table, alternatively for sensing a rotation speed of the proportional to the advance speed and in which a reference variable of the speed control device is the advance speed or the roller rotation speed.

3. The device according to claim 1, in which the speed control device is configured such that a reference variable of the speed control device a contact time per area with the strip material.

4. The device according to claim 1, wherein the reference variable of the speed control device is a retraction in the strip material.

5. The device according to claim 1, wherein the speed control device is configured such that an angular speed of the wear body is in the order of 0.5 to 10 revolutions per minute.

6. The device according to claim 1, further comprising a position regulator device for regulating an extended position of the at least one wear body to a predetermined target position and
a positioning drive for extending the at least one wear body transversely to the transport direction into the target position.

7. The device according to claim 6, wherein the speed control device is configured such that a reference variable of the position control device is a force with which the at least one wear body is pressed against the strip material on the transport device.

8. The device according to claim 6, further comprising a sensor for sensing a lateral position of the strip material and in which the reference variable of the position regulator device is a setpoint position for the strip material on the transport device.

9. The device according to claim 6, wherein the positioning drive is a hydraulic drive.

10. The device according to claim 1, wherein the rotary drive for the at least one wear body is an electric motor.

11. The device according to claim 1, in which a maintenance prognosis device displays an expected next maintenance date as a function of a previous maintenance date and of events since the previous maintenance date.

12. The device according to claim 1, in which the transport device for the strip material comprises a roller table with rollers.

13. A method for transporting strip material, comprising the steps of:
transporting the strip material via a transport device with lateral guide elements on at least one side of the transport device over a predetermined distance,
rotation of at least one wear body on each lateral guide element around an axis perpendicular to the transport direction with a rotary drive,
calculation of a target speed or a change in speed to a specific target speed of the at least one wear body by a speed control device,
setting the calculated target speed or changing it for the rotary drive, wherein a peripheral speed of the at least one wear body is lower than an advance speed of the strip material on the transport device.

14. The method according to claim 13, wherein the transport device is a roller table, wherein a reference variable of the speed control device is an advance speed of the strip material or the roller speed of rotation of the roller table.

15. The method according to claim 13, wherein a reference variable of the speed control device is a contact time per surface with the strip material.

16. The method according to claim 13, wherein a reference variable of the speed control device is a retraction in the strip material.

17. The method according to claim 13, wherein an angular speed of the wear body is in the order of 0.5 to 10 revolutions per minute.

18. The method according to claim 13 further comprising the steps of
regulating an extended position of the at least one wear body to a predetermined target position by a position regulator device, and
extending the at least one wear body transversely to the transport direction into the target position by a positioning drive.

19. The method according to claim 18, wherein a reference variable of the position regulator device is a force with which the at least one wear body is pressed against the strip material on the transport device.

20. The method according to claim 18, in which a lateral position of the strip material is detected by a sensor and a reference variable of the position regulator device is a setpoint position for the strip material on the transport device.

21. The method according to claim 13, in which a maintenance forecasting device displays an expected next maintenance date as a function of a previous maintenance date and of events since the previous maintenance date.

* * * * *